United States Patent
DeWitt, Jr. et al.

(10) Patent No.: US 7,062,684 B2
(45) Date of Patent: Jun. 13, 2006

(54) ENABLING TRACING OF A REPEAT INSTRUCTION

(75) Inventors: Jimmie Earl DeWitt, Jr., Georgetown, TX (US); Frank Eliot Levine, Austin, TX (US); Robert John Urquhart, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 493 days.

(21) Appl. No.: 10/325,078

(22) Filed: Dec. 19, 2002

(65) Prior Publication Data

US 2004/0123084 A1    Jun. 24, 2004

(51) Int. Cl.
*G06F 11/00* (2006.01)

(52) U.S. Cl. .................... 714/45; 712/227; 712/241
(58) Field of Classification Search ............... 712/227, 712/241, 244; 717/128–135; 714/45
See application file for complete search history.

(56) References Cited

U.S. PATENT DOCUMENTS

| | | | |
|---|---|---|---|
| 4,910,663 A * | 3/1990 | Bailey | 714/34 |
| 5,359,608 A | 10/1994 | Belz et al. | 371/16.5 |
| 5,446,876 A | 8/1995 | Levine et al. | 395/184.01 |
| 5,574,937 A | 11/1996 | Narain | 395/800 |
| 5,933,626 A | 8/1999 | Mahalingaiah et al. | 395/568 |
| 5,944,841 A | 8/1999 | Christie | 714/38 |
| 6,003,128 A * | 12/1999 | Tran | 712/241 |
| 6,106,573 A | 8/2000 | Mahalingaiah et al. | 717/4 |
| 6,253,338 B1 * | 6/2001 | Smolders | 714/45 |
| 6,507,921 B1 * | 1/2003 | Buser et al. | 714/45 |
| 6,560,697 B1 * | 5/2003 | Sato | 712/245 |
| 6,915,416 B1 * | 7/2005 | Deng et al. | 712/227 |
| 2002/0194466 A1 * | 12/2002 | Catherwood et al. | 712/241 |
| 2005/0144426 A1 * | 6/2005 | Col et al. | 712/241 |

FOREIGN PATENT DOCUMENTS

| | | |
|---|---|---|
| JP | 03-022146 | 1/1991 |
| JP | 04-054636 | 2/1992 |
| JP | 05-173779 | 7/1993 |

OTHER PUBLICATIONS

PowerPC 604 RISC Microprocessor User's Manual.*
"Branch Exception Mechanism", IBM Technical Bulletin, vol. 33, No. 10B, Mar. 1991.
"Method and System Using Hardware Assistance for Instruction Tracing With Secondary Set of Interruption Resources", U.S. Appl. No. 10/045,537, filed Jan. 14, 2002.
"Method and System Using Hardware Assistance for Instruction Tracing By Revealing Executed Opcode or Instruction", U.S. Appl. No. 10/045,124, filed Jan. 14, 2002.

(Continued)

*Primary Examiner*—Dov Popovici
*Assistant Examiner*—Benjamin P. Geib
(74) *Attorney, Agent, or Firm*—Marilyn S. Dawkins; Amy J. Pattillo

(57) ABSTRACT

A method and system for enabling tracing of a repeat instruction are provided. A repeat instruction is executed within a processor. In response to detecting a repeat instruction flag set during a last execution of the repeat instruction, an interrupt is initiated within the processor. The processor enables reading a count of executions for the repeat instruction from a storage unit within the processor by a trace program or external hardware during the interrupt.

17 Claims, 12 Drawing Sheets

OTHER PUBLICATIONS

"Method and System Using Hardware Assistance for Continuance of Trap Mode During or After Interruption Sequences", U.S. Appl. No. 10/045,513, filed Jan. 14, 2002.

"Method and System for Instruction Tracing with Enhanced Interrupt Avoidance", U.S. Appl. No. 10/045,307, filed Jan. 14, 2002.

* cited by examiner

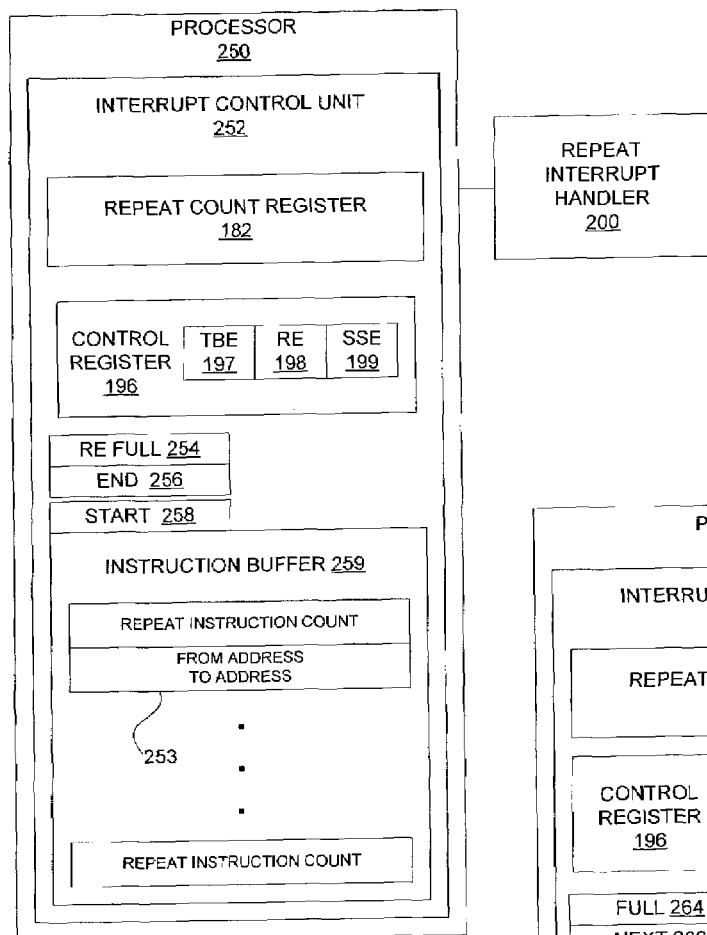
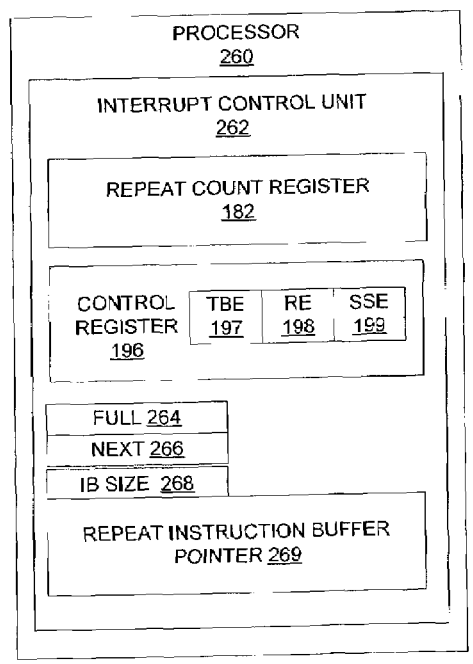
FIGURE 10
FIGURE 11

ENABLING TRACING OF A REPEAT INSTRUCTION

BACKGROUND OF THE INVENTION

1. Technical Field

The present invention relates in general to microprocessors and, in particular, to tracing an instruction stream of a microprocessor. Still more particularly, the present invention relates to tracing the count register of a microprocessor to assess the execution of a repeat instruction.

2. Description of the Related Art

In analyzing the performance of a data processing system or the applications executing within the data processing system, it is helpful to understand the execution flows and the use of system resources. An instruction trace may include a listing of the instructions executed by a processor while an application or system program is running. Instruction traces are analyzed to create performance models and to statistically monitor portions of system behavior. Dynamic usage of instruction types and other fields, address translation and memory reference patterns, and branch behavior and basic block sizes are among the many subjects of trace analysis. The extracted statistics reflect the behavior of the particular combination of architecture, implementation, system software, and application program from which the trace was collected, and so can be used to guide design decisions by developers of all of these components.

In particular, a trace may contain various levels of information. An address trace, for example, contains the sequence of memory addresses used to access instructions and operands. An instruction trace contains instruction opcodes and register specifiers in addition to the sequence of memory addresses.

Conventional tracing tools may use hardware, software, or a combination of hardware and software to obtain traces. On the hardware side, many processors include modes that allow for tracing. A focus of current processors is a branch tracing feature which causes an interrupt on detection of a taken branch instruction and traces the taken branch instruction. Gathering information about which branch instructions are most often taken and which branches are most often the exception, is useful information.

While tracing tools have focused on tracing branches and exceptions, gathering traces on the execution of other types of instructions would be advantageous. In particular, it would be advantageous to monitor the executions of repeat instructions, such as repeat string instructions. For example, it would be advantageous to monitor whether an instruction was repeated the requested number of times or whether an interrupt stopped the repeat cycle. By tracing a repeat instruction, the speed at which repeat instructions are executed may be monitored.

Therefore, it would be advantageous to have hardware and software tracing tools for monitoring and examining repeat instructions to determine the impact of repeat instructions on software performance. Further, it would be advantageous to trace both repeat and branch instructions.

SUMMARY OF THE INVENTION

In view of the foregoing, it is therefore an object of the present invention to provide improved microprocessor functions.

It is another object of the present invention to provide a method, system and program for tracing an instruction stream of a microprocessor.

It is yet another object of the present invention to provide a method, system and program for tracing an instruction stream of a microprocessor to assess the execution of repeat instructions.

According to one aspect of the present invention, a repeat instruction is executed within a processor. In response to detecting a repeat instruction flag set during a last execution of the repeat instruction, an interrupt is initiated within the processor. The processor enables reading a count of executions for the repeat instruction from a storage unit within the processor by a trace program or external hardware during the interrupt.

According to one embodiment, the first time a repeat instruction is executed, the CX register value is copied into a repeat count register within the processor. When the last execution of a repeat instruction is detected, then an interrupt is generated. The processor enables a trace program to read the difference between the value in the CX register and the value in the repeat count register to determine the actual number of times a repeat instruction executed.

According to another embodiment, a repeat instruction information buffer is available within the processor for storing the number of executions of multiple repeat instructions. Alternatively, the processor may point to a buffered memory location outside the processor. The first time a repeat instruction is executed, the CX register value is copied into a repeat count register within the processor. Then, when the last execution of a repeat instruction is detected, the processor copies the difference between the current CX register value and the value in the repeat count register into the repeat instruction information buffer, such that the actual number of times a repeat instruction is executed is stored. When the instruction information buffer is full, an interrupt is triggered. The processor enables a trace program to read the instruction information buffer.

According to a further embodiment, a processor includes a performance monitor with counter registers. The counter registers include a rep occurrence counter. According to a first option, the rep occurrence counter is set to count the occurrence of a repeat instruction by being programmed to one away from overflow. Upon detecting the occurrence of a repeat instruction, the counter increases and overflows, triggering an interrupt. According to a second option, the rep occurrence counter is set to count the occurrence of the last execution of a repeat instruction which causes the counter to increase and overflow, triggering an interrupt. Another rep executions counter starts counting each execution of a repeat instruction upon detection of a repeat instruction. Thus, when the interrupt is triggered, the processor enables the trace program to read the rep executions counter which has counted the actual number of times a repeat instruction executed.

According to yet another embodiment, a first sequential repeat instruction is modified by a tracing program to cause an interrupt in a processor. In response to detecting the interrupt in the processor, the repeat instruction is traced by accessing a storage unit containing the actual number of times the repeat instruction executed. The repeat instruction is then modified to return-from-interrupt. Alternatively, in response to detecting a branch interrupt passing the first sequential repeat instruction, the repeat instruction is restored and a next sequential repeat instruction is modified to cause an interrupt if executed.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 10 depicts a block diagram of a processor enabled to trace and store repeat instructions in accordance with the method, system, and program of the present invention;

FIG. 11 depicts a block diagram of a processor enabled to trace and store repeat instructions to memory external to the processor in accordance with the method, system and program of the present invention;

DETAILED DESCRIPTION OF THE PREFERRED EMBODIMENT

Figure 1:
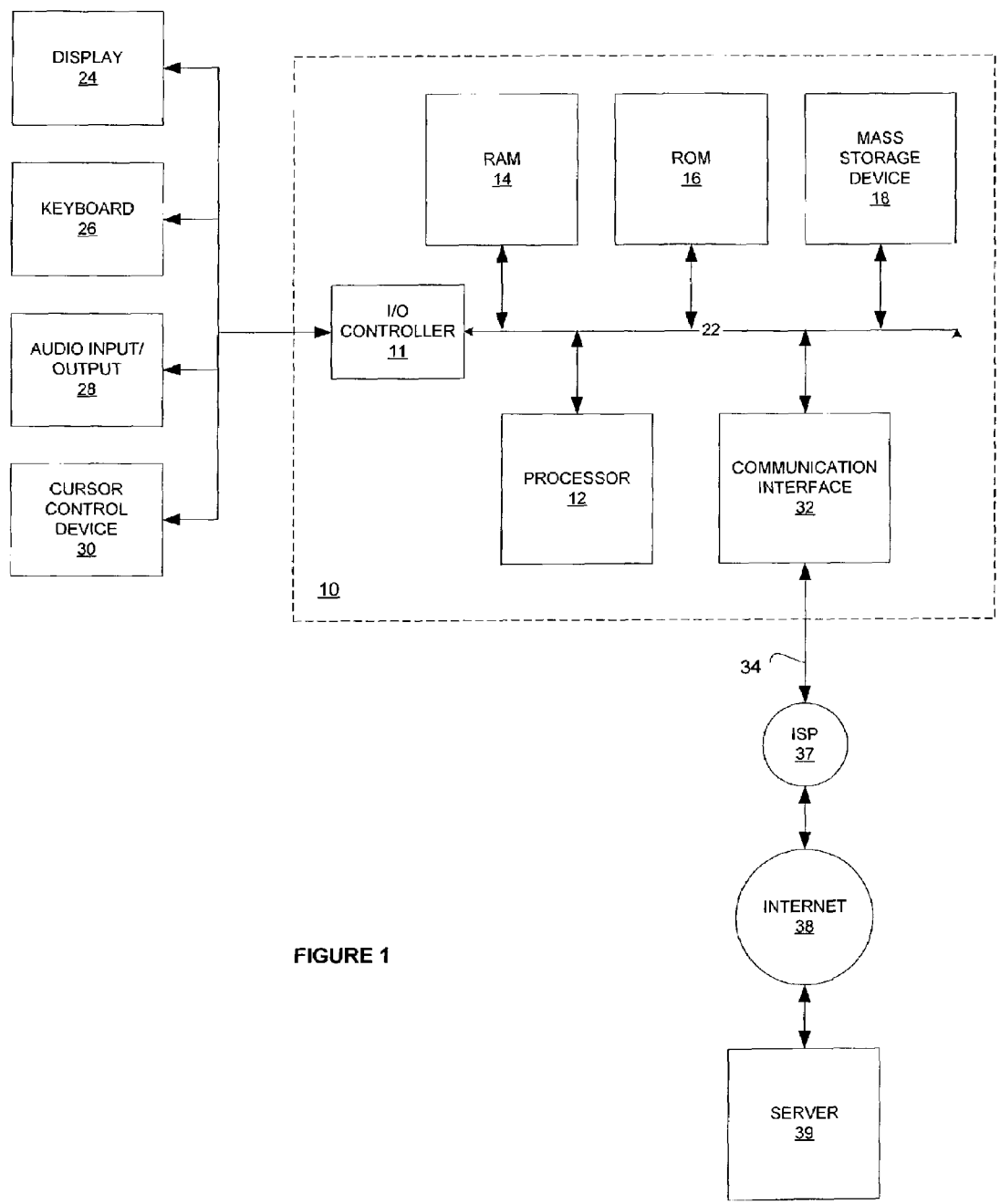
FIG. 1 depicts a block diagram of one embodiment of a computer system in which the present invention may be implemented

Turning now to the figures, FIG. 1 depicts one embodiment of a computer system in which the present invention may be implemented. Computer system 10 includes a bus 22 or other communication device for communicating information within computer system 10, and at least one processing device such as processor 12, coupled to bus 22 for processing information. Bus 22 preferably includes low-latency and higher latency paths that are connected by bridges and controlled within computer system 10 by multiple bus controllers.

Processor 12 may be a general-purpose processor such as IBM's PowerPC™ processor that, during normal operation, processes data under the control of operating system and application software stored in a dynamic storage device such as random access memory (RAM) 14 and a static storage device such as Read Only Memory (ROM) 16. The operating system preferably provides a graphical user interface (GUI) to the user. In a preferred embodiment, application software contains machine executable instructions that when executed on processor 12 carry out the operations depicted in the flowcharts of FIGS. 8, 9, 12, 14, 15, and 16, and others described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 10 to perform a process according to the present invention. The term "machine-readable medium" as used herein includes any medium that participates in providing instructions to processor 12 or other components of computer system 10 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 10 can read and which is suitable for storing instructions. In the present embodiment, an example of a non-volatile medium is mass storage device 18. Volatile media include dynamic memory such as RAM 14. Transmission media include coaxial cables, copper wire or fiber optics, including the wires that comprise bus 22. Transmission media can also take the form of acoustic or light waves, such as those generated during radio frequency or infrared data communications.

Moreover, the present invention may be downloaded as a computer program product, wherein the program instructions may be transferred from a remote computer such as a server 39 to requesting computer system 10 by way of data signals embodied in a carrier wave or other propagation medium via a network link 34 (e.g., a modem or network connection) to a communications interface 32 coupled to bus 22. Communications interface 32 provides a two-way data communications coupling to network link 34 that may be connected, for example, to a local area network (LAN), wide area network (WAN), or as depicted herein, directly to an Internet Service Provider (ISP) 37. In particular, network link 34 may provide wired and/or wireless network communications to one or more networks.

ISP 37 in turn provides data communication services through the Internet 38 or other network. Internet 38 may refer to the worldwide collection of networks and gateways that use a particular protocol, such as Transmission Control Protocol (TCP) and Internet Protocol (IP), to communicate with one another. ISP 37 and Internet 38 both use electrical, electromagnetic, or optical signals that carry digital data streams. The signals through the various networks and the signals on network link 34 and through communication interface 32, which carry the digital data to and from computer system 10, are exemplary forms of carrier waves transporting the information.

Further, multiple peripheral components may be added to computer system 10, connected to an input/output (I/O) controller 11 coupled to bus 22. For example, an audio input/output device 28 is attached to I/O controller 11 for controlling audio input through a microphone or other sound or lip motion capturing device and for controlling audio output through a speaker or other audio projection device. A display 24 is also attached to I/O controller 11 for providing visual, tactile or other graphical representation formats. A keyboard 26 and cursor control device 30, such as a mouse, trackball, or cursor direction keys, are coupled to I/O controller 11 as interfaces for user inputs to computer system 10. In alternate embodiments of the present invention, additional input and output peripheral components may be added.

FIG. 1 is intended as an example of a computing environment in which a processor may function and as not as an architectural limitation. The present invention may be executed in a variety of systems, including a variety of computing systems and electronic devices under a number of different operating systems. In one embodiment of the present invention, the computing system is a portable computing system such as a notebook computer, a palmtop computer, a personal digital assistant, a telephone or other electronic computing system that may also incorporate communications features that provide for telephony, enhanced telephony, messaging and information services. However, the computing system may also be, for example, a desktop computer, a network computer, a midrange computer, a server system or a mainframe computer. Therefore, in general, the present invention is executed in a computer system that performs computing tasks such as manipulating data in storage that is accessible to the computer system. In addition, the computer system may include at least one output device and at least one input device.

Figure 2:
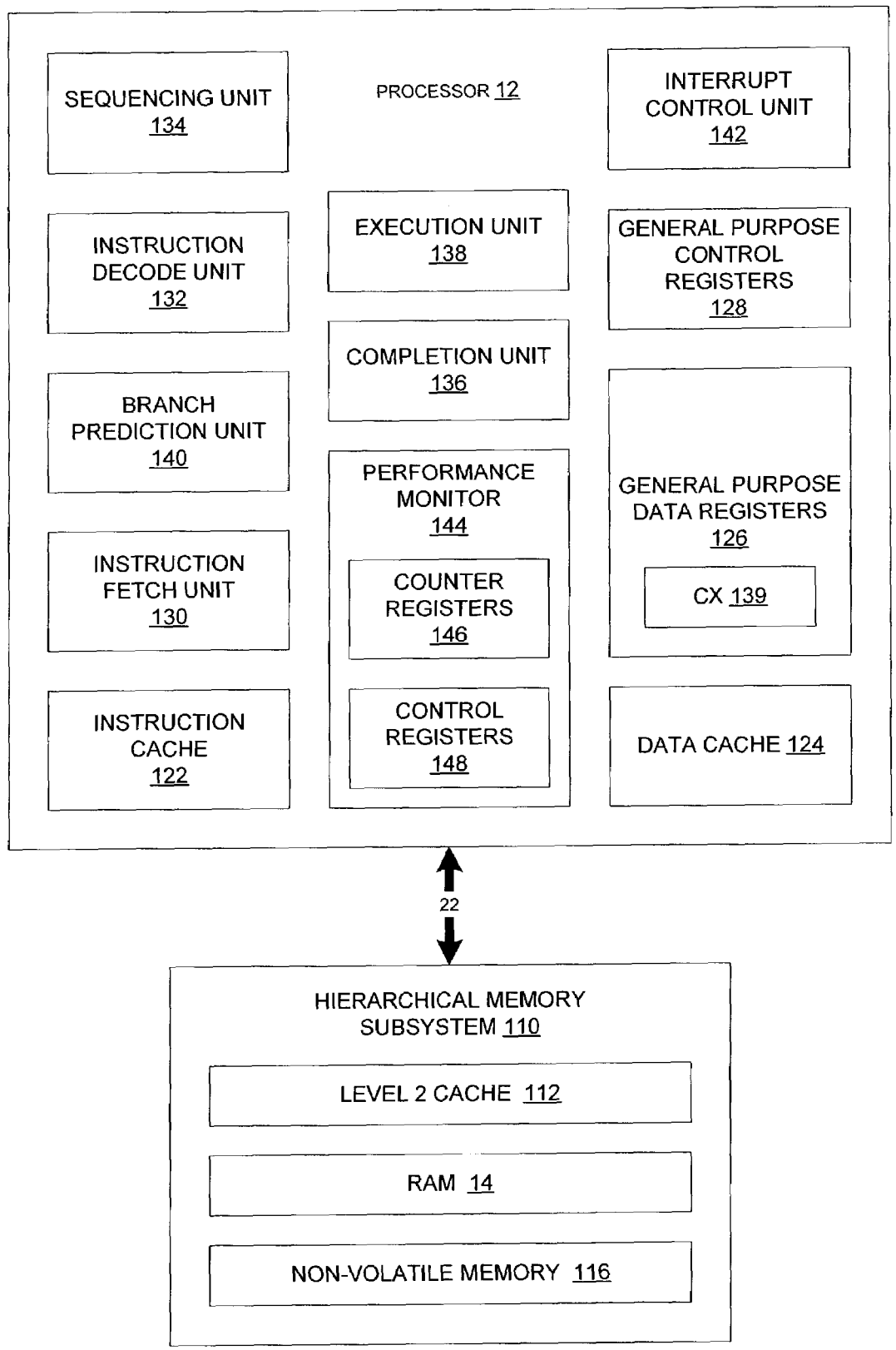
FIG. 2 depicts a block diagram of the typical structures in a processor and a memory subsystem that may be used within a computing system, such the computer system shown in FIG. 1.

With reference now to FIG. 2, there is depicted a block diagram of the typical structures in a processor and a memory subsystem that may be used within a computing system, such the computer system shown in FIG. 1. Hierarchical memory 110 illustrates an example of one type of memory hierarchy accessible by processor 12. In the example, hierarchical memory 110 comprises Level 2 cache 112, RAM 14, and non-volatile memory 116. Level 2 cache 112 provides a fast access cache to data and instructions that may be stored in RAM 14 in a manner known in the art. It will be understood that many types of cache architectures may be implemented. RAM 14 provides main memory storage for data and instructions and may also provide a cache for data and instructions stored in nonvolatile memory 116, such as mass storage device 18 as shown in FIG. 1.

Processor 12 is a pipelined processor capable of executing multiple instructions in a single cycle. It will be understood that other types of processors may also be implemented. During operation of the data processing system, instructions and data are stored in hierarchical memory 110. Data and instructions may be transferred to processor from hierarchical memory on bus 22. Bus 22 may include common data path or independent data paths. In either case, processor 12 may provide separate instruction and data transfer paths within processor 12 in junction with instruction cache 122 and data cache 124. Instruction cache 122 contains instructions that have been cached for execution within the processor. Some instructions may transfer data to or from hierarchical memory 110 via data cache 124. Other instructions may operate on data that has already been loaded into general purpose data registers 126. General purpose data registers 126 typically includes multiple registers, such as an accumulator register (AX), a base register (BX), a count register (CX), and a data register (DX). In the figure, count register (CX) 139 is specifically depicted, as it relates to implementation of the present invention. In addition, some instructions may perform a control operation with respect to general purpose control registers 128.

Instruction fetch unit 130 retrieves instructions from instruction cache 122 as necessary, which in turn retrieves instructions from hierarchical memory 110 as necessary. Instruction decode unit 132 decodes instructions to determine basic information about the instruction, such as instruction type, source registers, and destination registers.

In this example, processor 12 is an out-of-order execution processor. It will be understood that other execution types of processors may also be implemented. Sequencing unit 134 uses the decoded information to schedule instructions for execution. To track instructions, completion unit 136 may have data and control structures for storing and retrieving information about scheduled instructions. As the instructions are executed by execution unit 138, information concerning the executing and executed instructions is collected in completion unit 136. Execution unit 138 may use multiple execution subunits. As instructions complete, completion unit 136 commits the results of the execution of the instructions; the destination registers of the instructions are made available for use by subsequent instructions, or the values in the destination registers are indicated as valid through the use of various control flags. Subsequent instructions may be issued to the appropriate execution subunit as soon as its source data is available.

In addition, in this example, processor 12 is depicted as a speculative execution processor. Generally, instructions are fetched and completed sequentially until a branch-type instruction alters the instruction flow, either conditionally or unconditionally. After instruction decode unit 132 recognizes a conditional branch operation, sequencing unit 134 may recognize that the data upon which the condition is based is not yet available. In this case, instruction fetch unit 130 may use one or more branch prediction mechanisms in branch prediction unit 140 to predict the outcome of the condition. Control is then speculatively altered until the results of the condition can be determined. Depending on the capabilities of the processor, multiple prediction paths may be followed, and unnecessary branches are flushed from the execution pipeline.

In particular, in this example, when instruction decode unit 132 recognizes a repeat instruction operation, sequencing unit 134 schedules the instruction for execution. A repeat instruction operation is typically identified by an instruction preceded by a "REP" prefix. The "n" number of times an instruction is to repeat is loaded into CX register 139. For purposes of the present invention, CX register 139 is a count register decremented each time a repeat instruction is executed. Thus, execution unit 138 performs the instruction "n" times or until a condition is met, decrementing CX register 139 with each execution. It should be noted that the present invention also may be implemented with a CX register that increments upon execution of a repeat instruction up to a specified value. Further, the present invention may be implemented with a CX register that decrements upon execution of a repeat instruction down to a specified value.

Interrupt control unit 142 controls events that occur during instruction processing that cause execution flow control to be passed to an interrupt handling routine which may be provided by software or by external hardware. A certain amount of the processor's state at the time of the interrupt is saved automatically by the processor. After completion of interruption processing, a return-from-interrupt (RFI) can be executed to restore the saved processor state, at which time processor 12 can proceed with the execution of the interrupted instruction. Interrupt control unit 142 may comprise various data registers and control registers that assist the processing of an interrupt.

Certain events occur with the processor as instructions are executed, such as cache accesses, Translation Lookaside Buffer (TLB) misses. Performance monitor 144 monitors those events and accumulates counts of events that occur as the result of processing instructions. Performance monitor 144 is a software-accessible mechanism intended to provide information concerning instruction execution and data storage; its counter registers and control registers can be read or written under software control via special instructions for that purpose. Performance monitor 144 contains multiple performance monitor counters (PMCs) or counter registers 146 that count events under the control of one or more control registers 148. The control registers are typically partitioned into bit fields that allow for event/signal selection and accumulation. Selection of an allowable combination of events causes the counters to operate concurrently; the performance monitor may be used as a mechanism to monitor the performance of the stages of the instruction pipeline.

Those of ordinary skill in the art will appreciate that the hardware in FIG. 2 may vary depending on the system implementation. The depicted example is not meant to imply architectural limitations with respect to the present invention.

Figure 3:
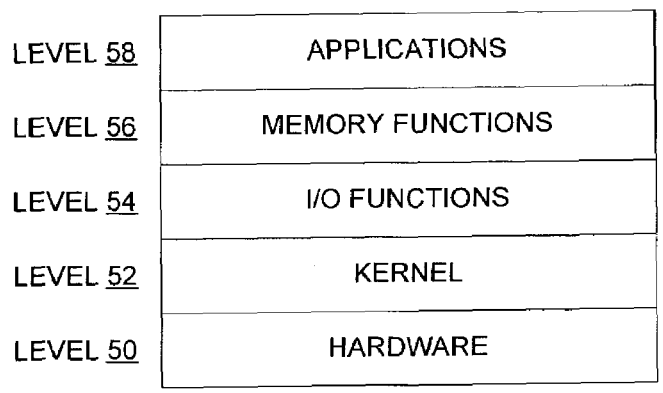
FIG. 3 depicts a block diagram showing the software components within a computer system and illustrating the logical relationship between the components as functional layers of software in accordance with the method, system, and program of the present invention.

With reference now to FIG. 3, there is illustrated a block diagram showing the software components within a computer system and illustrating the logical relationship between the components as functional layers of software in accordance with the method, system, and program of the present invention. The hardware of the computing system resides at level 50. The kernel residing in level 52 of the operating system provides a core set of functions that act as interface to the hardware. The I/O functions and drivers reside in level 54 and memory management and memory-related functions reside in level 56. User applications and other programs residing in level 58 access the functions in the other layers to perform general data processing. Levels 52, 54, and 56, as a whole, may be viewed as the operating system of a particular device. Assuming that the operating system is extensible, software drivers may be added to the operating system to support various additional functions required by user applications, such as device drivers for support of new devices added to the system.

The present invention may be implemented on a variety of hardware platforms and in a variety of software environments. Multiple operating systems may be executed within a single computing system.

Figure 4:
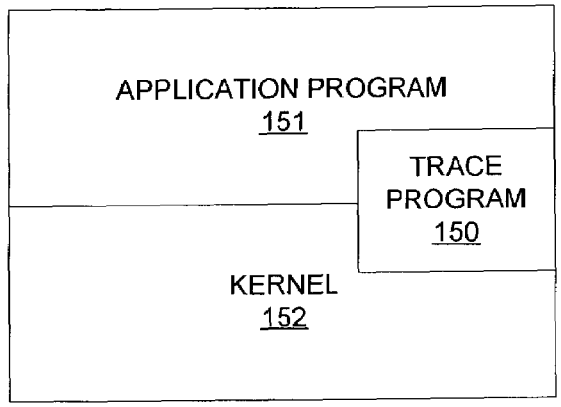
FIG. 4 depicts a block diagram of a relationship between software components in a data processing system analyzed by a trace facility in accordance with the method, system, and program of the present invention.

Referring now to FIG. 4, there is depicted a block diagram of a relationship between software components in a data processing system analyzed by a trace facility in accordance with the method, system, and program of the present invention. Trace program 150 contains interrupt handling routines used to analyze application program 151. Trace program 150 may be configured to handle a subset of interrupts on the data processing system that is being analyzed. For example, when an interrupt occurs from a taken-branch trap or a repeat instruction interrupt, functionally trace program 150 can perform various tracing functions, profiling functions, or debugging functions; hereinafter, the terms tracing, profiling, and debugging are used interchangeably. In addition, trace program 150 may be used to record data upon the execution of a hook, which is a specialized piece of code at a specific location in an application process. Trace hooks are typically inserted for the purpose of debugging, performance analysis, or enhancing functionality.

Typically, trace program 150 generates trace data of various types of information, which is written to a pinned trace data buffer such that no input or output is required while processing the exception or interrupt. Subsequently, the data written to the pinned trace data buffer is written to a data file for post-processing. For purposes of the present invention, trace program 150 generates trace data of repeat instruction executions, as well as taken-branch instructions and other types of instructions that effect system performance.

Both trace program 150 and application program 151 use kernel 152, which comprises and supports system level calls, utilities, and device drivers. Depending on the implementation, trace program 150 may have some modules that run at level 58 with application-level priority and other modules that run at level 52 with trusted, system-level priority. In particular, trace program 150 or other drivers enabled to handle an exception or interrupt is handled by trusted code (in privileged state).

It should be noted that the instruction tracing functionality of the present invention may be placed in a variety of contexts, including a kernel, a kernel driver, an operating system module, or a tracing process or program. Hereinafter, the term "tracing program" or "tracing software" is used to distinguish from typical kernel functionality and the processes generated by an application program.

Figure 5:
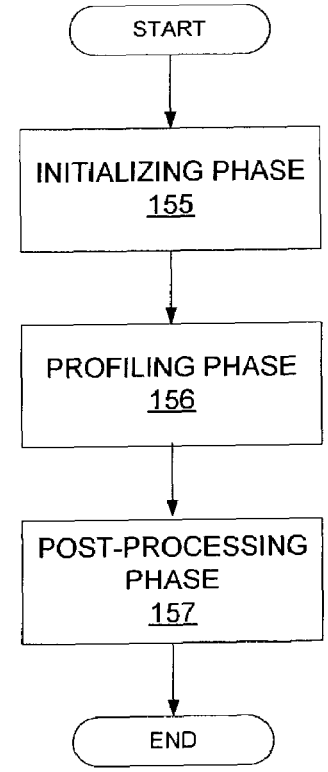
FIG. 5 depicts a high level logic flowchart of typical phases of a tracing program in accordance with the method, system, and program of the present invention.

With reference now to FIG. 5, there is illustrated a high level logic flowchart of typical phases of a tracing program in accordance with the method, system, and program of the present invention. First, an initialization phase 155 captures the state of the computer system at the time tracing is initiated. This trace initialization data may include trace records that identify all existing threads, all loaded classes, and all methods for the loaded classes; subsequently generated trace data may indicate thread switches, interrupts, and loading and uploading of classes and jitted methods. A special record may be written to indicate within the trace output when all of the startup information has been written. Next, profiling phase 156, traces records and writes the records to a trace buffer or file. Subject to memory constraints, the generated trace output may be as long and as detailed as an analyst requires for the purpose of profiling or debugging a particular program.

Finally, post-processing phase 157 sends data collected in the buffer to a file for post-processing. During post-processing, each trace record is processed in accordance with the type of information within the trace record. After all the trace records are processed, the information is typically formatted for output in the form of a report. The trace output may be sent to a server, which analyzes the trace output from processes on a computing system. Of course, depending on available resources or other considerations, the post-processing may also be performed on the computing system and may be performed even while the tracing is occuring.

In particular, during tracing initialization, the address, executable (e.g. application) name, and other relevant information are identified for all loaded code. The tracing program is then enabled to map traced addresses to executables and therefore to map addresses to instructions within the code and symbolic information for the code. When code is loaded dynamically, this information is also identified. In particular, when code is not part of the executable which can be read from disk (or its symbolic information read from disk) during post processing, then the load address of the code and its length are used to capture the code for subsequent post processing. This function is supported by many Java profilers using the Java Virtual Machine Profiling Interface (JVMPI).

By identifying address, executable name, and other relevant information during the initialization phase, then during the profiling phase it is sufficient to simply record the processes and the addresses of the executed code. Based on the information identified during the initialization phase and the processes and addresses recorded during the profiling phase, the post processing phase uses symbolic mapping to identify the names of the functions and methods being executed and to determine which code was executed.

Figure 6:
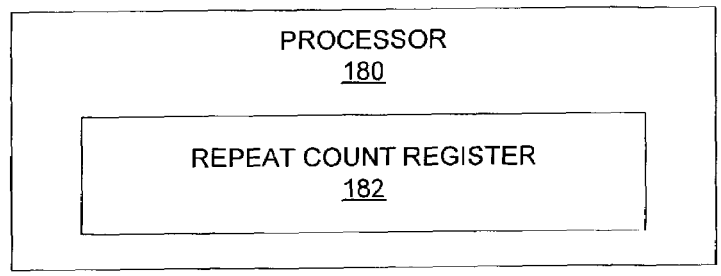
FIG. 6 depicts a block diagram of a repeated instruction register within a processor that may be used to reveal execution information about a repeat instruction in accordance with the method, system, and program of the present invention.

Referring now to FIG. 6, there is a illustrated a block diagram of a repeated instruction register within a processor that may be used to reveal execution information about a repeat instruction in accordance with the method, system, and program of the present invention. As depicted, processor 180, which is similar to processor 12, includes a special repeat count register 182. Repeat count register 182 contains a copy of the value of the CX indicating the number of repetitions scheduled for a repeat instruction. Repeat count register 182 may be physically placed within various units within processor 180, as appropriate. In addition, repeat count register 182 may be implemented as the CX register. It should be noted that repeat count register 182 need not be a dedicated purpose register; processor 180 may deliver a copy of the most recently executed instruction to a general purpose register, a performance monitor register, or other register as may be configured for or as may be appropriate for the implemented processor architecture. Further, it should be noted that repeat count register may be shared to also store the to and from addresses of a taken-branch instruction.

Figure 7:
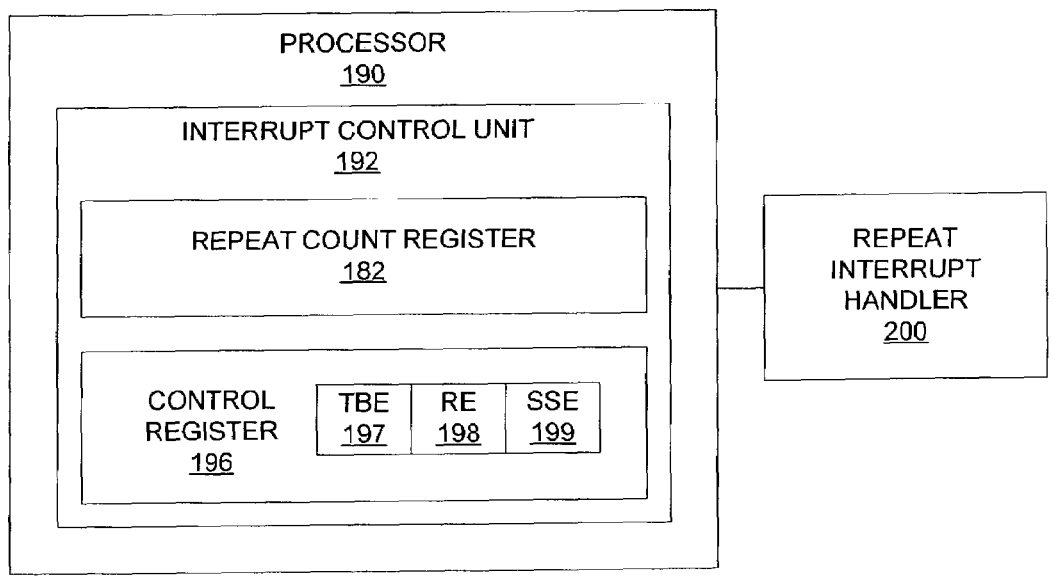
FIG. 7 depicts a block diagram of a processor enabled to trace repeat instructions in accordance with the method, system, and program of the present invention.

Referring now to FIG. 7, there is depicted a block diagram of a processor enabled to trace repeat instructions in accordance with the method, system, and program of the present invention. As illustrated, processor 190 includes an interrupt control unit 192, as described in FIG. 2. Interrupt control unit includes repeat count register 182. In addition, interrupt control unit 192 includes a control register 196. Control register 196 may use one or more bits that are set or cleared as necessary to indicate a mode, a condition, or some other type of operational state within the processor. The term "flag" is typically used to describe a one-bit field. While depicted as a structure within interrupt control unit 192 in this example, control register 196 may be in multiple locations within a processor.

Control register 196 includes a repeat enable (RE) flag 198. RE flag 198 is a software-specifiable flag that triggers an interrupt when a repeat instruction is detected. The tracing program as described in FIGS. 4 and 5, and more specifically repeat interrupt handler 200, may set RE flag 198 to stop the processor when a repeat instruction is detected or when a repeat instruction has completed execution.

In addition, control register 196 includes a single-step enable (SSE) flag 199. SSE flag 199 is also a software specifiable flag that when set causes a single-step trap to occur following a successful execution of an instruction. Further, control register 196 includes a taken-branch enable (TBE) flag 197 that when set causes a taken-branch trap to occur when a branch-type instruction is successfully completed. It will be understood that other flags may also be necessary within control register 196. For example, control register 196 may also include flags such as an interrupt-enable (IE) flag that indicates whether interrupts will be fielded, i.e., whether external interrupts will cause the processor transfer control to an external interruption handler. Further, it should be noted that the repeat interrupt handler and branch-taken interrupt handler may function as a single handler that detects which type of instruction occurred before the interrupt and performs the functions for that type of instruction.

In a first option, when RE flag 198 is set and a repeat instruction is detected, then interrupt control unit 192 generates an interrupt (trap mode). A trace program, repeat interrupt handler 200 gathers machine state information, including the CX register indicating the number of times the repeat instruction is set to execute. In addition, repeat interrupt handler 200 may set SSE flag 198 to trace the execution of the repeat instruction for the number repetitions indicated in the CX register.

In a second option, when RE flag 198 is set and a repeat instruction is detected, then interrupt control unit 192 does not interrupt the processor until the last time the repeat instruction executes. The first time a repeat instruction is executed, however, the CX register is copied into repeat count register 182. When the last execution of a repeat instruction is detected, then interrupt control unit 192 generates an interrupt. Repeat instruction handler reads the difference between the value in the CX register and the value in the repeat count register.

The second option offers the advantage of only tracing the repeat instruction if it has occurred. Additionally, some repeat instructions are conditional. Use of these instructions may require setting the CX register to its highest value so that the instruction can repeat numerous times until a condition is detected. In the case of conditional repeat instructions, tracing the repeat instruction after the last execution will provide a more accurate trace.

Figure 8:
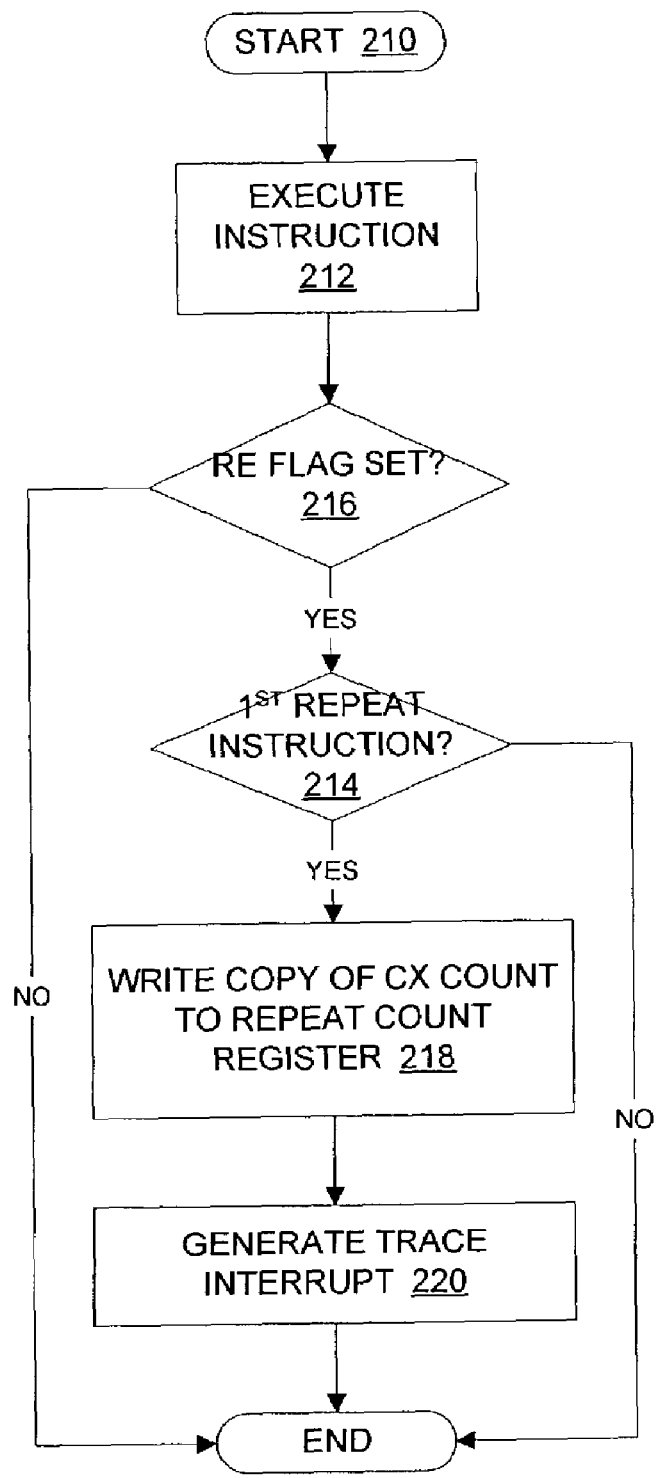
FIG. 8 depicts a high level logic flowchart of a process and program for use of a repeat enable flag within a processor.

With reference now to FIG. 8, there is illustrated a high level logic flowchart of a process and program for use of a repeat enable flag within a processor. As depicted, the process starts at block 210 and thereafter proceeds to block 212. Block 212 illustrates executing an instruction. Next, block 216 illustrates a determination whether the RE flag is set. If the RE flag is not set, then the process ends. If the RE flag is set, then the process passes to block 214. Block 214 depicts a determination whether the executed instruction is the first execution of a repeat instruction. If the instruction is not the first execution of a repeat instruction, then the process ends. If the instruction is the first execution of a repeat instruction, then the process passes to block 218. Block 218 depicts writing the value of the CX register into the repeat count register. Next, block 220 illustrates generating a trace interrupt, and the process ends. It should be noted that after executing an instruction, if the instruction is not a repeat instruction, then a determination may be made whether instruction is a taken-branch instruction or other type of specialized instruction. If the instruction is a taken-branch instruction and the TBE flag is set, then the process will generate an interrupt trace to trace the taken-branch instruction.

Figure 9:
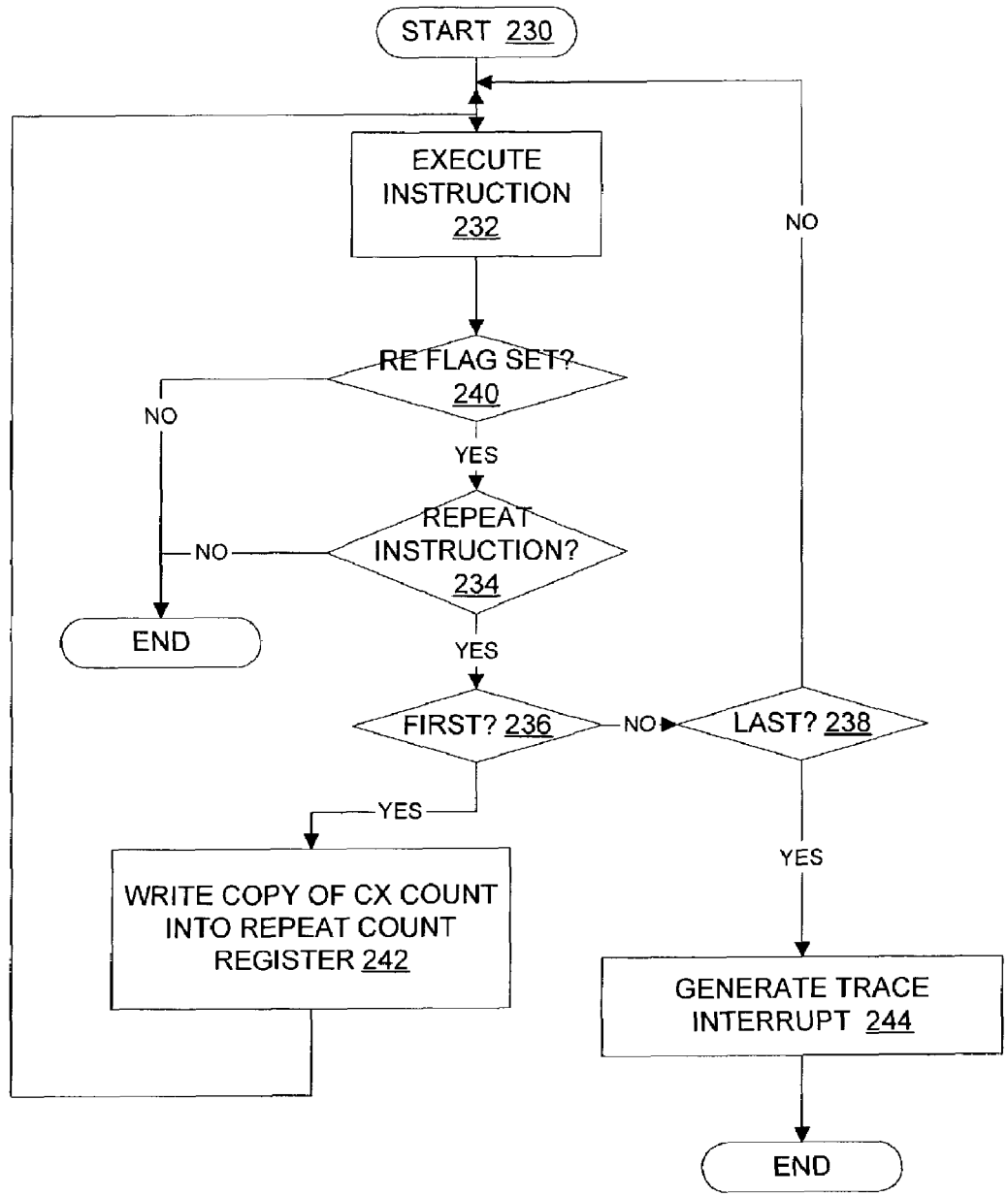
FIG. 9 depicts a high level logic flowchart of a process and program for use of a repeat enable flag within a processor to trace a completed repeat instruction.

Referring now to FIG. 9, there is illustrated a high level logic flowchart of a process and program for use of a repeat enable flag within a processor to trace a completed repeat instruction. As depicted, the process starts at block 230 and thereafter proceeds to block 232. Block 232 illustrates executing an instruction. Next, block 240 illustrates a determination of whether the RE flag is set. If the RE flag is not set, then the process ends. If the RE flag is set, then the process passes to block 234. Block 234 depicts a determination whether the executed instruction is a repeat instruction. If the instruction is not a repeat instruction, then the process ends. If the instruction is a repeat instruction, then the process passes to block 236. Block 236 depicts a determination of whether the instruction is the first execution of the repeat instruction. If the instruction is the first execution, then the process passes to block 242. Block 242 depicts writing a copy of CX register into the repeat count register, and process passes back to block 232.

Returning to block 236, if the instruction is not the first execution, then the process passes to block 238 to determine if it is the last execution. If it is not the last execution, then the process passes to block 232; if it is the last execution, then the process passes to block 244. Block 244 depicts generating a trace interrupt, and the process ends. The trace program preferable reads the difference between the value in the repeat count register and the value in the CX register to record the actual number of times the repeat instruction is executed.

With reference now to FIG. 10, there is depicted a block diagram of a processor enabled to trace and store repeat instructions in accordance with the method, system, and program of the present invention. As illustrated, processor 250 includes an interrupt control unit 252 with repeat count register 182 and control register 196, as described in FIG. 7. In addition, interrupt control unit 252 includes a repeat instruction information buffer 259 for storing the count of multiple repeat instructions, rather than just a single repeat instruction. Instruction information buffer 259 may be a dedicated set of registers or incorporated within existing registers. Importantly, instruction information buffer 259 can be read by the trace program. It should be noted that instruction information buffer 259 could be shared for writing CX value for repeat instructions and the from and to addresses for taken-branch instructions. For example, the entries 253 in instruction buffer include information for repeat instructions and taken-branch instructions. The entries for repeat instructions and taken-branch instructions may be distinguished from one another by masking or other techniques available for distinguishing between data in a buffer.

The processor places a copy of the CX register value into instruction information buffer 259. RE flag 198 and TBE flag 197 may be used to qualify the use of instruction information buffer 259. The processor should store the CX register value (indicating the count for the repeat instruction) into repeat instruction information buffer if RE flag 198 is set. Further, the process should store the from and to addresses for a taken-branch instruction if TBE flag 197 is set. In this example, instruction information buffer 259 is filled in a rotating manner. Start pointer 258 and end pointer 256 are used to point to the first and last entries in instruction information buffer 259.

In a first option, upon detecting a first repeat instruction when RE flag 198 is set, the value of the CX register is copied into instruction information buffer 259. Instruction information buffer 259 then contains the count expected for each repeat instruction executed at least once.

In a second option, when RE flag 198 is set, the CX register value may be copied into repeat count register 182 when the first execution of a repeat instruction is detected. Then, when the last execution of the repeat instruction is detected, the processor copies difference between the original CX register value in repeat count register 182 and the CX register value after the last repeat instruction executes, so that the actual number of times the repeat instruction is executed is stored in instruction information buffer 259.

To prevent buffer overflow, RE full flag 254 is associated with instruction information buffer 259. When instruction information buffer 259 is full, RE full flag 254 is set, generating an interrupt. Alternatively, other types of flags could cause an interrupt. For example, if TBE flag 197 is set in response to a taken-branch instruction, an interrupt to empty instruction information buffer 259 may be initiated.

In response to the interrupt, a trace program, such as repeat interrupt handler 200 is called by processor 250 in an attempt to empty instruction information buffer 259. Repeat interrupt handler 200 controls emptying instruction information buffer 259 to another memory location. Once finished moving the buffered information, repeat interrupt handler 200 sends a return-from-interrupt (RFI) to give control back to processor 260, at which time processor 260 resets start pointer 258 and end pointer 256.

Referring now to FIG. 11, there is illustrated a block diagram of a processor enabled to trace and store repeat instructions to memory external to the processor in accordance with the method, system and program of the present invention. Processor 260 is similar to processor 250 except processor 260 utilizes a repeat instruction information buffer pointer 269 in lieu of an instruction information buffer. The size constraints of a buffer within processor 260 are relatively limited compared with the storage area available in memory outside processor 260. Therefore, repeat instruction buffer pointer 269 points to a location in memory outside the processor where the instruction information buffer can be found. It should be noted that the instruction information buffer may also be used to store taken-branch instructions. Further, it should be noted that a separate taken-branch instruction information buffer pointer to a separate taken-branch instruction information buffer may be implemented.

When appropriate, the processor writes a copy of the CX register value to the instruction information buffer pointed to by repeat instruction buffer pointer 269. Alternatively, the processor writes the difference between the CX register value and the value stored in repeat count register 182 to the instruction information buffer pointed to be repeat instruction buffer pointer 269. The instruction information buffer (IB) size is held in IB size register 268. The next unused entry offset buffer indicator is held in next register 266. Full flag 264 is set when the repeat instruction information buffer is full, causing an interrupt calling for the repeat interrupt handler 200 to control storage of the instruction information buffer to a trace buffer location.

Figure 12:
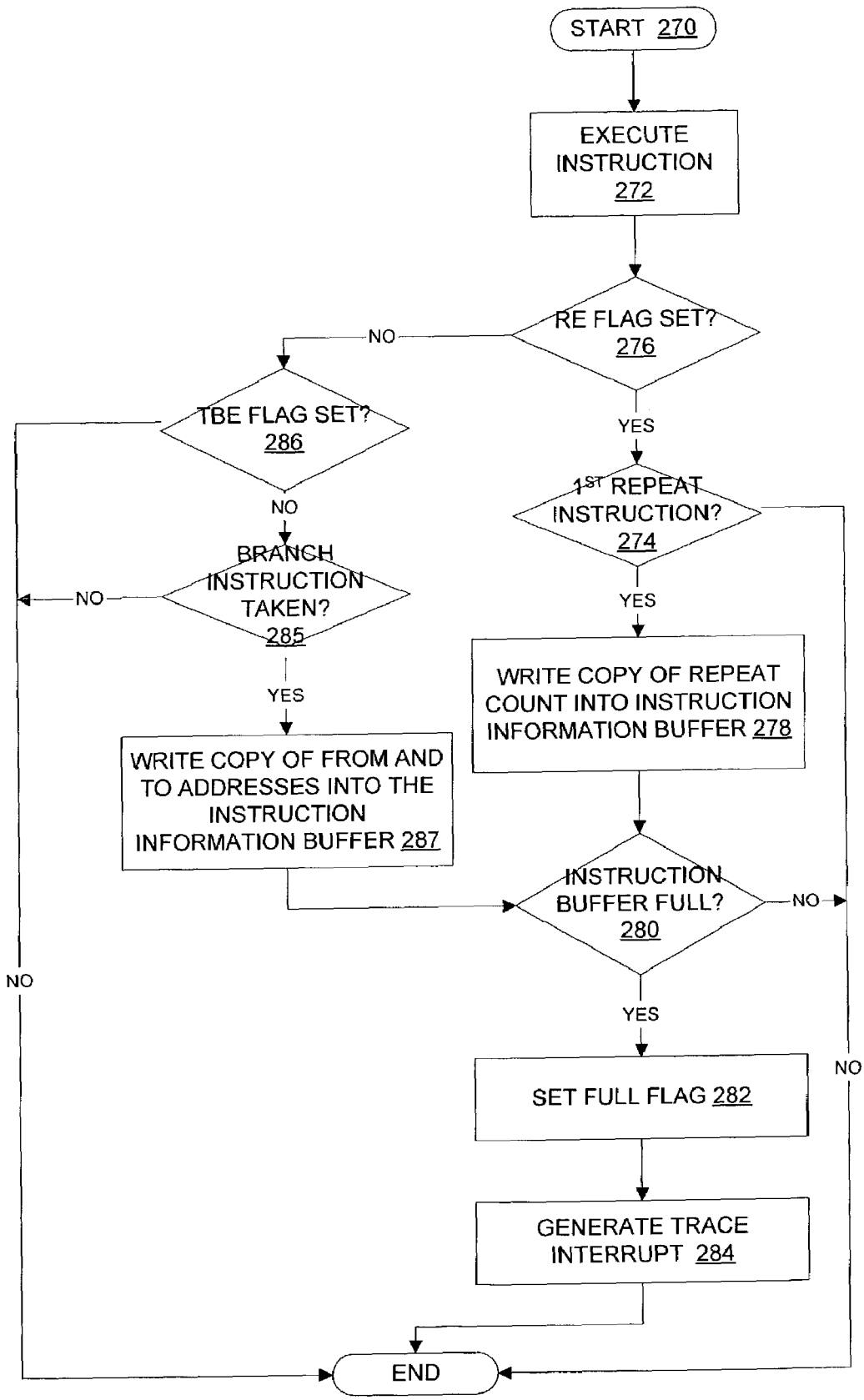
FIG. 12 depicts a high level logic flowchart of a process and program for using a repeat enable flag to trace repeat instruction counts in a buffer.

With reference now to FIG. 12, there is depicted a high level logic flowchart of a process and program for using a repeat enable flag to trace repeat instruction counts in a buffer. As illustrated, the process starts at block 270 and thereafter proceeds to block 272. Block 272 depicts executing an instruction. Next, block 276 depicts a determination whether the RE flag is set. If the RE flag is set, then the process passes to block 274; otherwise the process passes to block 286. Block 274 illustrates a determination whether the executed instruction is the first execution of a repeat instruction. If the executed instruction is the first execution of a repeat instruction, then the process passes to block 278; otherwise the process ends. Block 278 illustrates writing a copy of the CX register count into the instruction information buffer. Alternatively, a copy of the CX register count may be written into an instruction information buffer pointed to be a repeat instruction information buffer pointer. In addition, alternatively, upon detection of the first execution of a repeat instruction, the value of the CX register may be stored in a repeat count register. Then when the last execution of the repeat instruction is detected, the difference between the value of the CX register stored in the repeat count register and the current value of the CX register is stored in the instruction information buffer.

Next, block 280 depicts a determination whether the instruction information buffer is full. If the instruction information buffer is not full, then the end pointer is incremented and the process ends; otherwise, the process passes to block 282. Block 282 illustrates setting the full flag. Next, block 284 depicts generating a trace interrupt, and the process ends.

Returning to the starting steps of the process, block 286 illustrates a determination whether the TBE flag is set. If the TBE flag is set, then the process passes to block 285; otherwise the process ends. Block 285 depicts a determination whether a branch was taken. If a branch is not taken, then the process ends. If a branch is taken, then the process passes to block 287. Block 287 depicts copying the from and to addresses into the instruction information buffer marked as a taken-branch record, and the process passes to block 280.

Figure 13:
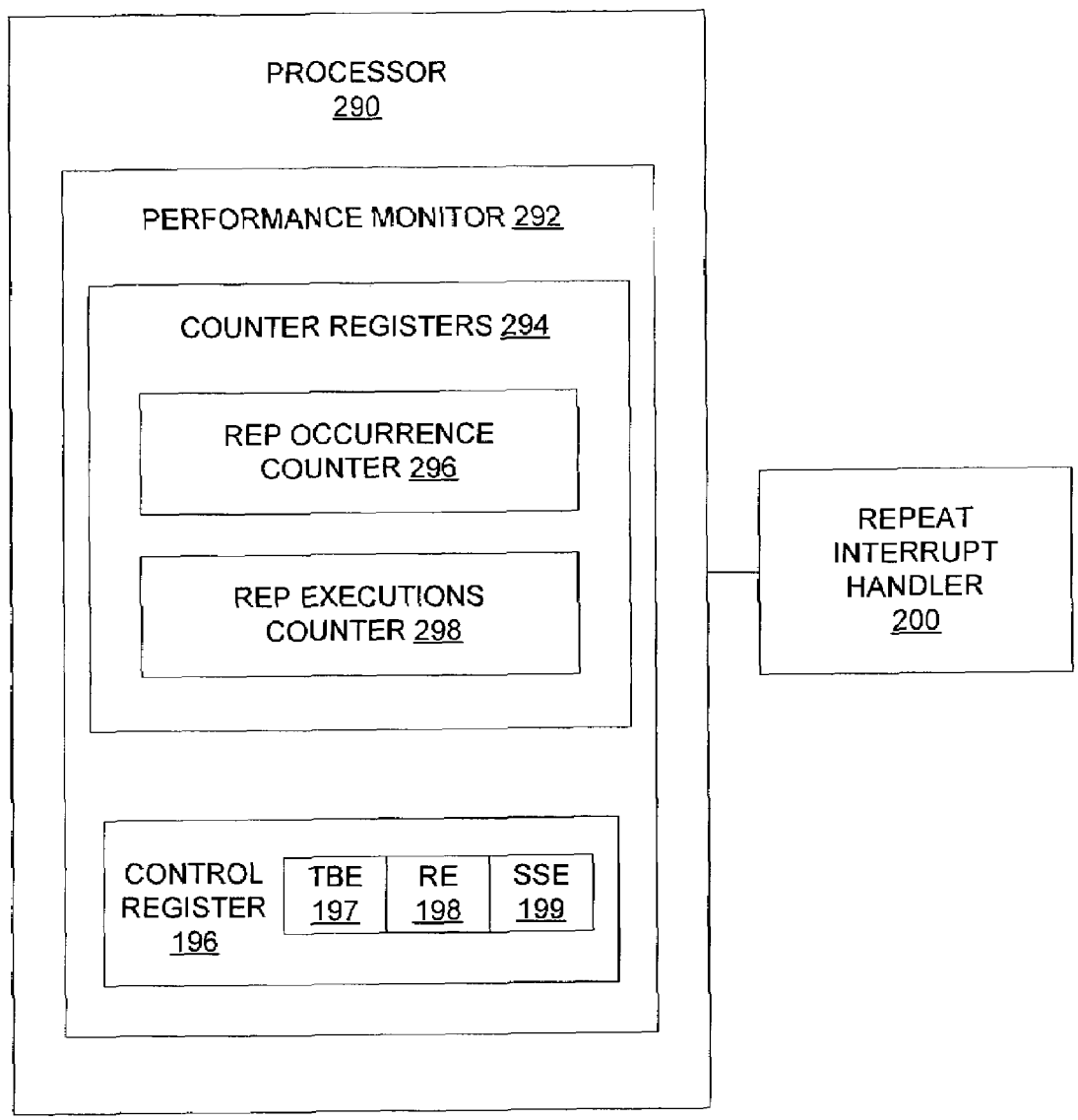
FIG. 13 depicts a block diagram of processor enabled to control tracing of repeat instructions in accordance with the method, system, and program of the present invention.

Referring now to FIG. 13, there is illustrated a block diagram of processor enabled to control tracing of repeat instructions in accordance with the method, system, and program of the present invention. As depicted, processor 290 includes a performance monitor 292, in addition to other components typically within a processor. Performance monitor 292 includes counter registers 294 and control register 196.

Counter registers 294 includes a rep occurrence counter 296. According to one option, rep occurrence counter 296 is set to count the occurrence of a repeat instruction. The counter is programmed to one away from an overflow. Upon detecting the occurrence of a repeat instruction, the counter increase and overflows, triggering an interrupt. The interrupt calls the repeat interrupt handler to trace the instruction stream, including the value in the CX register. The value in the CX register may indicate the number of times a repeat instruction is scheduled to execute.

In addition, counter registers 294 includes a rep executions counter 298. According to a second option, rep occurrence counter 296 is set to count the completed occurrence of a repeat instruction. Rep executions counter 298 is set to count the number of times a single repeat instruction is actually executed. Upon detection of a first repeat instruction, rep occurrence rep executions counter 298 starts counting the number of times the repeat instruction executes. Upon detection of the completion of the repeat instruction, rep occurrence counter 296 increments by one, causing an overflow which triggers an interrupt. The interrupt calls repeat interrupt handler 200 to read the value in rep executions counter 298. In particular, the value read from the rep executions counter 298 is the number of times the repeat instruction actually executed. It should be noted that counter register 294 may include additional counters, such that, the number of executions of multiple repeat instructions may be counted before an interrupt is generated.

Figure 14:
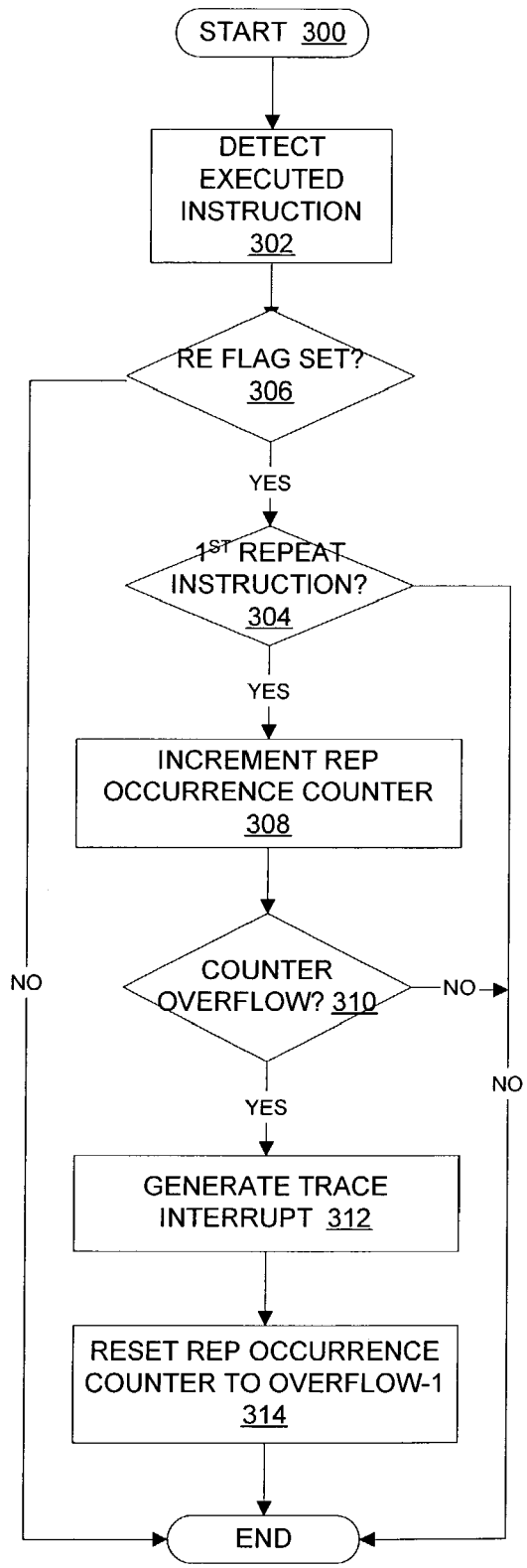
FIG. 14 depicts a high level logic flowchart of a process and program for controlling an interrupt to trace a repeat instruction using a performance monitor counter.

With reference now to FIG. 14, there is depicted a high level logic flowchart of a process and program for controlling an interrupt to trace a repeat instruction using a performance monitor counter. As illustrated, the process starts at block 300 and thereafter proceeds to block 302. Block 302 depicts a detection of an executed instruction. Next, Block 306 depicts a determination whether the RE flag is set. If the RE flag is set, then the process passes to block 304; otherwise the process ends. Block 304 illustrates a determination whether the executed instruction is the first execution of a repeat instruction. If the executed instruction is the first execution of a repeat instruction, then the process passes to block 308; otherwise the process ends. Block 308 illustrates incrementing the rep occurrence counter. Next, block 310 depicts a determination whether the rep occurrence counter overflowed. If the rep occurrence counter overflowed, then the process passes to block 312; otherwise the process ends. Block 312 illustrates generating a trace interrupt, and the process ends.

Figure 15:
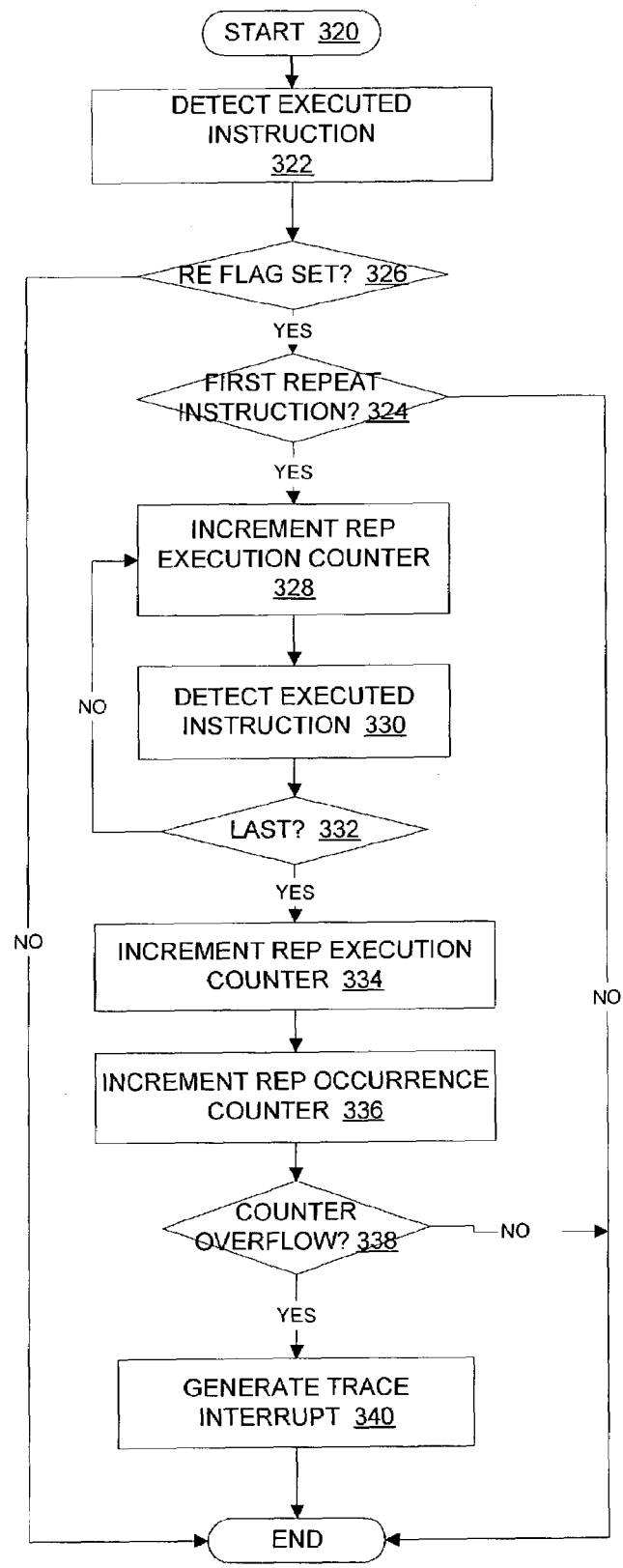
FIG. 15 depicts a high level logic flowchart of a process and program for controlling an interrupt to trace a repeat instruction through multiple performance monitor counters.

Referring now to FIG. 15, there is illustrated a high level logic flowchart of a process and program for controlling an interrupt to trace a repeat instruction through multiple performance monitor counters. As illustrated, the process starts at block 320 and thereafter proceeds to block 322. Block 322 depicts a detection of an executed instruction. Next, block 324 illustrates a determination whether the executed instruction is the first execution of a repeat instruction. If the executed instruction is the first execution of a repeat instruction, then the process passes to block 326; otherwise the process ends. Block 326 depicts a determination whether the RE flag is set. If the RE flag is set, then the process passes to block 328; otherwise the process ends. Block 328 illustrates incrementing the rep execution counter. Next, block 330 depicts detecting an executed instruction. Thereafter, block 332 illustrates a determination whether that executed instruction is the last execution of a repeat instruction. If the executed instruction is the last execution of a repeat instruction, then the process passes to block 334; otherwise the process passes to block 328, unless an overriding interrupt instruction is detected. Block 334 depicts incrementing the rep execution counter. Next, block 336 illustrates incrementing the rep occurrence counter. Block 338 depicts a determination whether the rep occurrence counter overflowed. If the rep occurrence counter overflowed, then the process passes to block 340; otherwise the process ends. Block 340 illustrates generating a trace interrupt, and the process ends.

Figure 16:
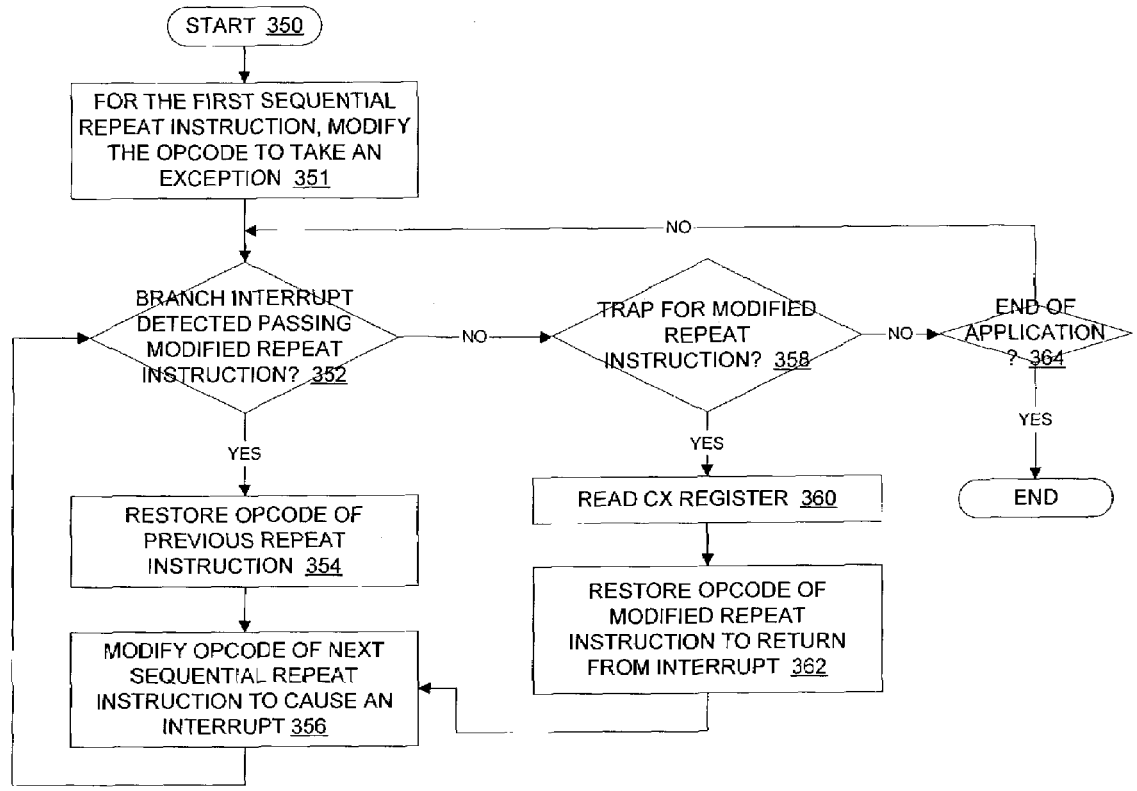
FIG. 16 depicts a high level logic flowchart of a process and program for inserting trace hooks in an application one repeat instruction at a time.

With reference now to FIG. 16, there is depicted a high level logic flowchart of a process and program for inserting trace hooks in an application one repeat instruction at a time. The process and program may be performed by a trace program, such as the repeat interrupt handler. The process advantageously inserts interrupt hooks one repeat instruction at a time. As illustrated, the process starts at block 350 and thereafter proceeds to block 351. Block 351 depicts, for the first sequential repeat instruction, modifying the opcode to take an exception (causing an interrupt). Next, block 352 depicts a determination whether a taken-branch interrupt is detected causing the program to pass the modified repeat instruction. If a taken-branch interrupt is detected passing the modified repeat instruction, then the process passes to block 354. Block 354 illustrates restoring the opcode of the previous modified repeat instruction. Next, block 356 depicts modify the opcode of the next sequential repeat instruction to cause an interrupt, and the process returns to block 352.

Returning to block 352, if a taken-branch interrupt is not detected, then the process passes to block 358. Block 358 illustrates a determination whether a trap for the modified repeat instruction is detected. If a trap is not detected, then the process determines whether the end of the application is reached at block 370 and returns to block 364 if the end of the application is not reached. If a trap is detected, then the process passes to block 354 to read the CX register and other portions of the instruction stream into a trace buffer. Next, block 362 depicts restoring the opcode of the repeat instruction to cause a return from interrupt, and the process passes to block 356.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular types of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

While the invention has been particularly shown and described with reference to a preferred embodiment, it will be understood by those skilled in the art that various changes in form and detail may be made therein without departing from the spirit and scope of the invention.

What is claimed is:

1. A method for enabling tracing of a repeat instruction, comprising:

enabling a repeat instruction flag within a processor that when set directs an interrupt controller to trigger an interrupt upon completion of a repeat instruction, wherein said repeat instruction comprises at least one particular instruction to be repeated and a particular number of repetitions intended for said at least one particular instruction prior to completion of said repeat instruction;

programming at least one control unit within said processor to copy said particular number of repetitions into a separate storage unit within said processor independent of a counter decremented upon each execution of said at least one particular instruction, upon detection of said repeat instruction and said repeat instruction flag set;

responsive to detecting said repeat instruction in at least one line of code executing within said processor and said repeat instruction flag set, copying said particular number of repetitions to said counter and said separate storage unit within said processor;

executing said at least one particular instruction of said repeat instruction within said processor, wherein said counter decrements for each execution of said at least one particular instruction;

responsive to detecting a last execution of said at least one particular instruction while said repeat instruction flag is still set, initiating an interrupt within said processor; and enabling a read of a count of actual executions for said repeat instruction from a comparison of a value within said storage unit within said processor with a remaining count in said counter during said interrupt.

2. The method for enabling tracing of a repeat instruction according to claim 1, wherein said repeat instruction flag is at least one from among a repeat enable flag set to cause an interrupt, a buffer full flag set by an overflow, a trace hook instruction, an overflow of a performance monitor counter.

3. The method for enabling tracing of a repeat instruction according to claim 1, wherein enabling a read of a count of executions for said repeat instruction further comprises:

enabling a trace program to read from said storage unit comprising at least one from among a CX register within said processor holding said count of executions, a repeat count register within said processor holding said count of executions, and an instruction information buffer accessible to via said processor holding said count of executions.

4. The method for enabling tracing of a repeat instruction according to claim 1, further comprising:

setting said repeat instruction flag by setting a first performance monitor counter to one away from an overflow and programming said first performance monitor counter to increment upon detection of a last execution of said repeat instruction and programming an interrupt control unit to interrupt upon overflow of said first performance monitor counter;

tracking said count of executions in a second performance monitor counter within said processor;

responsive to detecting said last execution of said repeat instruction, incrementing said first performance monitor counter to overflow; and during said interrupt triggered by said interrupt control unit upon overflow of said first performance monitor, enabling a read of said count of executions from said second performance monitor counter.

5. The method for enabling tracing of a repeat instruction according to claim 1, further comprising:

enabling said repeat instruction flag that when set directs said interrupt controller to trigger an interrupt when said separate storage unit is full, wherein said separate storage unit comprises space for a plurality of entries, wherein each of said plurality of entries comprises a separate count of actual executions for a separate repeat instruction from among a plurality of repeat instructions executed on said processor;

responsive to detecting, for each of said plurality of repeat instructions, said last execution of said at least one particular instruction while said repeat instruction flag is still set, storing a difference between said initially copied particular number of repetitions and said remaining count in said counter within said separate entry;

only initiating said interrupt after tracking a count of executions for said plurality of repeat instructions, wherein said separate storage unit is full; and enabling a read of said plurality of entries during said interrupt.

6. The method for enabling tracing of a repeat instruction according to claim 1, further comprising
in response to detecting said interrupt, enabling a tracing program to read said count of executions of said repeat instruction from said storage unit and executed address into a pinned buffer; and
controlling a matching of said executed address with an instruction of an executable stored at said executed address to map said count of executions to a particular repeat instruction within said executable.

7. A system for enabling tracing of a repeat instruction, comprising:
a processor traceable by a tracing program;
means for enabling a repeat instruction flan within a processor that when set directs an interrupt controller to trigger an interrupt upon completion of a repeat instruction, wherein said repeat instruction comprises at least one particular instruction to be repeated and a particular number of repetitions intended for said at least one particular instruction prior to completion of said repeat instruction;
means for programming at least one control unit within said processor to copy said particular number of repetitions into a separate storage unit within said processor independent of a counter decremented upon each execution of said at least one particular instruction, upon detection of said repeat instruction and said repeat instruction flag set;
means, responsive to detecting said repeat instruction in at least one line of code and said repeat instruction flan set, for copying said particular number of repetitions to said counter and said separate storage unit within said processor;
means for executing said at least one particular instruction of said repeat instruction within said processor, wherein said counter decrements for each execution of said at least one particular instruction;
means, responsive to detecting a last execution of said at least one particular instruction while said repeat instruction flag is still set, for initiating an interrupt within said processor; and
means for enabling a read of a count of actual executions for said repeat instruction from a comparison of a value within said storage unit within said processor with a remaining count in said counter during said interrupt.

8. The system for enabling tracing of a repeat instruction according to claim 7, wherein said repeat instruction flag is at least one from among a repeat enable flag set to cause an interrupt, a buffer full flag set by an overflow, a trace hook instruction, an overflow of a performance monitor counter.

9. The system for enabling tracing of a repeat instruction according to claim 7, wherein enabling a read of a count of executions for said repeat instruction further comprises:
means for enabling a trace program to read from said storage unit comprising at least one from among a CX register within said processor holding said count of executions, a repeat count register within said processor holding said count of executions, and an instruction information buffer accessible to via said processor holding said count of executions.

10. The system for enabling tracing of a repeat instruction according to claim 7, further comprising:
means for setting said repeat instruction flag by setting a first performance monitor counter to one away from an overflow and programming said first performance monitor counter to increment upon detection of a last execution of said repeat instruction and programming an interrupt control unit to interrupt upon overflow of said first performance monitor counter;
means for tracking said count of executions in a second performance monitor counter within said processor;
means responsive to detecting said last execution of said repeat instruction, for incrementing said first performance monitor counter to overflow; and
during said interrupt triggered by said interrupt control unit upon overflow of said first performance monitor, means for enabling a read of said count of executions from said second performance monitor counter.

11. The system for enabling tracing of a repeat instruction according to claim 7, further comprising:
means for enabling said repeat instruction flag that when set directs said interrupt controller to trigger an interrupt when said separate storage unit is full, wherein said separate storage unit comprises space for a plurality of entries, wherein each of said plurality of entries comprises a separate count of actual executions for a separate repeat instruction from among a plurality of repeat instructions executed on said processor;
means, responsive to detecting, for each of said plurality of repeat instructions, said last execution of said at least one particular instruction while said repeat instruction flag is still set, for storing a difference between said initially copied particular number of repetitions and said remaining count in said counter within said separate entry;
means for only initiating said interrupt after tracking a count of executions for said plurality of repeat instructions, wherein said separate storage unit is full; and
means for enabling a read of said plurality of entries during said interrupt.

12. The system for enabling tracing of a repeat instruction according to claim 7, further comprising
means for enabling a tracing program to read said count of executions of said repeat instruction from said storage unit and executed address into a pinned buffer, in response to detecting said interrupt; and
means for controlling a matching of said executed address with an instruction of an executable stored at said executed address to map said count of executions to a particular repeat instruction within said executable.

13. The method of claim 1, wherein said repeat instruction comprises a repeat prefix and said at least one particular instruction is a string instruction.

14. The method of claim 1, wherein said control unit is an interrupt control unit and said separate storage unit is within a portion of memory allocation to said interrupt control unit.

15. The system of claim 7, wherein said repeat instruction comprises a repeat prefix and said at least one particular instruction is a string instruction.

16. The system of claim 7, wherein said control unit is an interrupt control unit and said separate storage unit is within a portion of memory allocation to said interrupt control unit.

17. A method for enabling tracing of both repeat instructions and branch instructions executed within a processor, comprising:
enabling within said processor a repeat instruction flag for controlling interrupts triggered after a last execution of a repeat instruction and a branch instruction flag for controlling interrupts triggered after a branch specified in a branch instruction is taken, wherein a repeat instruction comprises a repeat prefix to at least one string instruction and a specified number of repetitions intended for execution of said at least one string instruction prior to completion of said repeat instruction, wherein said branch instruction specifies a target address to branch to when a condition is met;

for each separate repeat instruction executing within said processor when said repeat instruction flag is set, tracking and writing a count of actual executions of said separate repeat instruction in a separate entry of a buffer accessible to said processor;

for each separate branch instruction where a branch is taken when said branch instruction flag is set, writing at least one address separate accessed by taking each said separate branch instruction in another separate entry of said buffer;

responsive to detecting said buffer is full, generating an interrupt within said processor; and enabling a read of each said separate entry in said buffer during said interrupt.

* * * * *